(No Model.)
P. WIEDERER.
COMBINATION MIRROR.
No. 518,382. Patented Apr. 17, 1894.
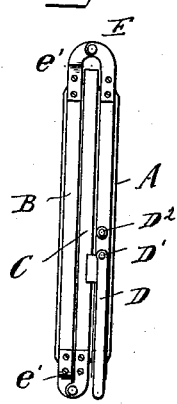
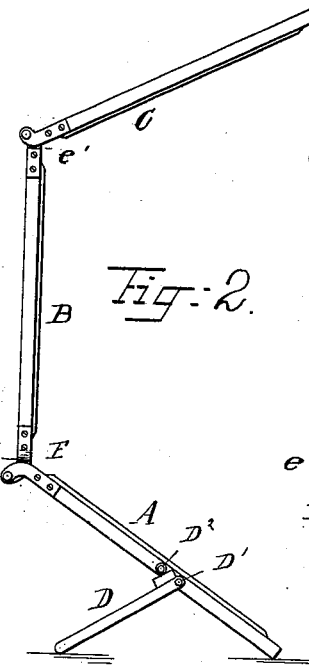
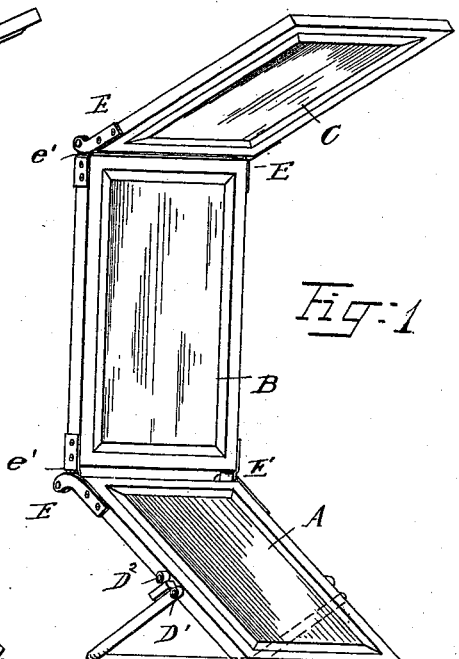
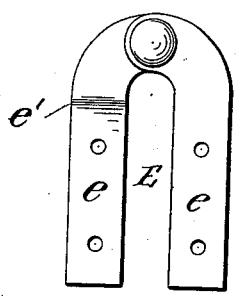
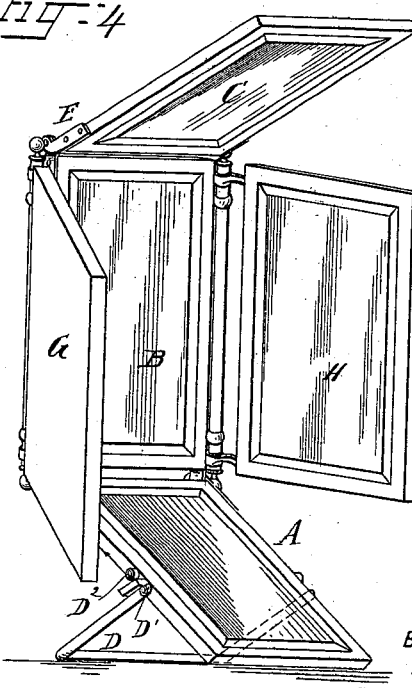
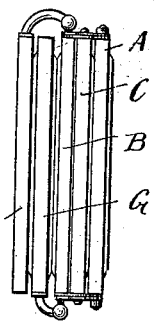
WITNESSES:
INVENTOR
P. Wiederer
BY
ATTORNEYS.

UNITED STATES PATENT OFFICE.

PETER WIEDERER, OF STAPLETON, NEW YORK.

COMBINATION-MIRROR.

SPECIFICATION forming part of Letters Patent No. 518,382, dated April 17, 1894.

Application filed January 25, 1894. Serial No. 498,043. (No model.)

*To all whom it may concern:*

Be it known that I, PETER WIEDERER, a citizen of the United States, and a resident of Stapleton, in the county of Richmond and State of New York, have invented certain new and useful Improvements in Combination-Mirrors, of which the following is a specification.

This invention relates to improvements in that class of combination-mirrors that are especially adapted for viewing the back of the head.

The object of my invention is to provide a new and improved mirror of this kind which permits the observer to view the back of his head, to obtain a face view and also if desired to obtain views of the sides of the face and head.

The invention consists of a central mirror frame, and a frame hinged to the top and bottom of the same to fold on the back of said central frame only.

The invention further consists in the combination with the above frames, of a frame hinged to each side of the central frame to fold over the front of the latter.

The invention also consists in the construction and combination of parts and details as will be fully described hereinafter and finally pointed out in the claims.

In the accompanying drawings, Figure 1 is a perspective view of my improved mirror erected for use. Fig. 2 is a side view of the same, in the same position. Fig. 3 is a side view of the same folded. Fig. 4 is a side view of a modified construction erected for use. Fig. 5 is a top view of the same folded. Fig. 6 is an enlarged detail side view of the hinge.

Similar letters of reference indicate corresponding parts.

My improved combination mirror is composed of the three mirrors A, B and C, each having a suitable frame, which are hinged to each other in such a manner that they can be folded on each other. A brace D is hinged at D' to the sides of the frame of the mirror A and above the pivots, stops $D^2$ project from sides of the frame against which stops the upper parts of the braces rest to hold the mirror A at a certain angle to the horizontal plane.

The lower end of the frame of the mirror B is hinged to the upper end of the frame of the mirror A by means of hinges E attached to the sides of the frames and composed of two curved hinge-pieces *e* of which one has a shoulder *e'* or stop against which the edge of the other piece can rest. This hinge permits the packs of the frames to swing toward each other for folding the mirror but does not permit swinging the faces of the frames any farther toward each other than shown in Figs. 1 and 2, as in that position the edges of the hinge-pieces *e* on the frame of the mirror A rest against the shoulders *e'* of the hinge-pieces on the frame of the mirror B. When in this position the mirror B is in vertical position or practically so.

The lower end of the frame of the mirror C is hinged by means of hinges E to the upper end of the mirror B in such a manner that the back of the frame of the mirror C can be folded against the back of the frame of the mirror B, and so that the faces of the mirror can only swing toward each other until the mirror C is in the position shown in Figs. 1 and 2, further movement of the face of the mirror C toward the mirror B being prevented by the shoulders or stops *e'* on the hinge-pieces *e* on the frame of the mirror B. When the combination mirror is erected as shown in Fig. 1, the face view of the observer is reflected by the mirror B and the back of the head is reflected from the mirror C upon the mirror A providing the head is inclined toward the mirror A. The face is also reflected in the mirror A. A lady, trying on her hat or dressing her hair is thus enabled to examine the appearance of the front part of the hair or hat as well as the back by slightly inclining the head or raising it. The head can be held in a natural and convenient position and need not be drawn down in between the shoulders as the mirror is so high above the head as not to interfere with the same or the ornaments worn in the hair.

When the mirror is not in use the same can be folded as shown in Fig. 3, the braces D being folded against the side of the frame of the mirror A, the back of the frame of the mirror C folded against the back of the frame of the mirror B and the back of the frame of the mirror A against the face of the frame of the mirror C so that the faces of the mirrors A and B appear on outer sides of the folded combination mirror.

As shown in Figs. 4 and 5 mirrors G and H can be hinged to the opposite sides of the frame of the mirror B so as to form a triplicate mirror for viewing the sides of the head and face in different positions. The mirror G can be folded over the face of the mirror B and the mirror H folded over the mirror G.

By means of the combination mirror shown in Fig. 4 all parts of the head can easily be viewed, all that is necessary being to slightly incline or turn the head.

I am aware that combination mirrors composed of a central mirror and side mirrors hinged to the same, and mirrors having top mirrors or reflectors are not new broadly and I do not claim such mirrors broadly as my invention, but Having explained and set forth my invention, what I claim as new, and desire to secure by Letters Patent, is—

1. The combination with a central frame and two end-frames, of hinges connecting the two ends of the central frame with the two end frames, which hinges are so constructed as to permit the end frames to swing in planes at right angles to the face of the central frame and which hinges have stops which permit of folding the end frames upon the central frame in one direction, but only permit the end frames to swing toward each other a limited distance in the opposite direction, substantially as set forth.

2. The combination with three mirror-frames, of which two are hinged to the top and bottom ends of the third or central frame by hinges having stops to limit the swing of the end frames toward one face of the central frame, of braces pivoted to the bottom frame and stops for said braces, substantially as set forth.

3. The combination with a central frame, of a frame hinged to each side of the same to fold over the face of the said central frame, a frame hinged to the bottom of the central frame, a frame hinged to the top of the central frame which top and bottom frames fold on the central frame and a brace for said bottom frame, substantially as set forth.

In testimony that I claim the foregoing as my invention I have signed my name in presence of two subscribing witnesses.

PETER WIEDERER.

Witnesses:
OSCAR F. GUNZ,
K. R. BRENNAN.